US010190270B2

(12) United States Patent
Hirman

(10) Patent No.: US 10,190,270 B2
(45) Date of Patent: Jan. 29, 2019

(54) SLEWING ASSEMBLY FOR A COLD PLANER

(71) Applicant: Colton J. Hirman, Rosemount, MN (US)

(72) Inventor: Colton J. Hirman, Rosemount, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 198 days.

(21) Appl. No.: 15/213,644

(22) Filed: Jul. 19, 2016

(65) Prior Publication Data
US 2018/0023261 A1    Jan. 25, 2018

(51) Int. Cl.
*E01C 23/088*  (2006.01)
*B65G 41/00*  (2006.01)

(52) U.S. Cl.
CPC .......... *E01C 23/088* (2013.01); *B65G 41/002* (2013.01); *B65G 41/008* (2013.01)

(58) Field of Classification Search
CPC ........ E01C 23/088; E01C 23/09; E01C 23/12; B65G 41/002
USPC .............................. 404/90–94; 299/36.1–39.9
See application file for complete search history.

(56) References Cited

U.S. PATENT DOCUMENTS

| 3,292,724 | A | * | 12/1966 | Fryer | B62D 12/00 180/420 |
| 5,178,253 | A | * | 1/1993 | Fix | B65G 21/14 198/317 |
| 5,188,208 | A | | 2/1993 | Hall | |
| 8,919,526 | B2 | | 12/2014 | Fickeisen et al. | |
| 2014/0183003 | A1 | | 7/2014 | Jorgensen et al. | |
| 2016/0053448 | A1 | | 2/2016 | Berning et al. | |

FOREIGN PATENT DOCUMENTS

EP    2837585    2/2015

* cited by examiner

*Primary Examiner* — Sunil Singh
(74) *Attorney, Agent, or Firm* — Jeff A. Greene

(57) ABSTRACT

A slewing assembly for providing a rotational movement of a loading conveyor pivotally supported on a cold planer is provided. The slewing assembly includes a frame-side structure and a conveyor-side structure. The slewing assembly includes a shaft pin disposed about a vertical axis, and pivotally connecting the frame-side structure and the conveyor-side structure. The slewing assembly also includes an actuator arrangement configured to generate a controlled bi-directional rotational movement of the shaft pin. The slewing assembly further includes a spline arrangement formed on the shaft pin and configured to transfer the controlled bi-directional rotational movement of the shaft pin as a controlled bi-directional rotational movement of the conveyor-side structure. The controlled bi-directional rotational movement of the conveyor-side structure provides the rotational movement of the loading conveyor, about the vertical axis, with respect to the frame.

20 Claims, 5 Drawing Sheets

SLEWING ASSEMBLY FOR A COLD PLANER

TECHNICAL FIELD

The present disclosure generally relates to a cold planer, and more particularly, to a slewing assembly for a cold planer that provides a rotational movement of a loading conveyor pivotally supported on a frame thereof.

BACKGROUND

Cold planers, sometimes called road mills or scarifiers, are work machines that are configured to mill a road surface. To this end, cold planers include a rotatable milling drum that is supported on a frame and can be brought into contact with the surface of the roadway. The milling drum removes a layer of the road surface. The cold planer further includes a conveyor connected to a frame of the machine and receives the material that was removed from the road surface and conveys the material to another vehicle, such as a dump truck, usually traveling next to the cold planer. In some instances it may be desirable to allow the conveyor to pivot relative to the machine frame in order to adjust the position of the conveyor. For example, it may be desired to feed the dump trucks which are located at the side of the cold planer as well as directly in front of it, and at various positions therebetween.

U.S. Pat. No. 8,919,526 (hereinafter referred to as '526 patent) describes a conveyor belt mounting for a charger that is used in road building, in order to supply a road-finishing machine with paving material. Using the slewing belt mounting, it is possible to achieve different discharge heights for the paving material. The slewing belt mounting comprises a cantilever arm, which is movably mounted on the frame of the charger, a pivot arm, which is pivotally connected to the cantilever arm, and a conveyor belt, which is connected to the pivot arm. The slewing belt mounting is characterized in that it comprises at least one lifting element, such as a hydraulic cylinder, cable winch, toothed rack, gear mechanism or the like, which is fastened by a first end to the frame and by a second end to the cantilever arm, wherein the cantilever arm is vertically adjustable by means of the lifting element.

Usually in such machines, the horizontal pivoting of the conveyor; or in other words, a rotational movement of the conveyor about a vertical axis relative to the frame of the machine, is provided using a pair of hydraulic cylinders that are connected to a forward end of the frame of the machine at respective first ends and to the conveyor at respective second ends. The simultaneous extension and retraction of these hydraulic cylinders causes the rotational movement of the conveyor about the vertical axis. These hydraulic cylinders are generally disposed angularly with respect to each other. This angular arrangement may not provide the most optimum cylinder geometry for providing the rotational movement of the conveyor. It may be contemplated that with such geometry, there is a possibility of differing cylinder travel velocities which could lead to uneven moment arms throughout the travel while causing situations where over-centering becomes an issue.

SUMMARY

In one aspect of the present disclosure, a slewing assembly for providing a rotational movement of a loading conveyor pivotally supported on a cold planer is described. The slewing assembly includes a frame-side structure extending from a frame towards the loading conveyor. The slewing assembly also includes a conveyor-side structure extending from the loading conveyor towards the frame-side structure. The slewing assembly includes a shaft pin disposed about a vertical axis, and pivotally connecting the frame-side structure and the conveyor-side structure. The slewing assembly also includes an actuator arrangement configured to generate a controlled bi-directional rotational movement of the shaft pin. The slewing assembly further includes a spline arrangement formed on the shaft pin and configured to transfer the controlled bi-directional rotational movement of the shaft pin as a controlled bi-directional rotational movement of the conveyor-side structure. The controlled bi-directional rotational movement of the conveyor-side structure provides the rotational movement of the loading conveyor, about the vertical axis, with respect to the frame.

In another aspect of the present disclosure, a slewing assembly for providing a rotational movement of a loading conveyor pivotally supported on a cold planer is described. The slewing assembly includes a frame-side structure extending from a frame towards the loading conveyor. The slewing assembly also includes a conveyor-side structure extending from the loading conveyor towards the frame-side structure. The slewing assembly includes a shaft pin disposed about a vertical axis, and pivotally connecting the frame-side structure and the conveyor-side structure. The slewing assembly also includes a yoke fixedly coupled with the shaft pin such that a controlled bi-directional rotational movement of the yoke provides a controlled bi-directional rotational movement of the shaft pin. The slewing assembly further includes a pair of hydraulically actuated cylinders operatively arranged in a parallel configuration with respect to each other. Each of the hydraulically actuated cylinders has a first end and a second end respectively. The first ends of the hydraulically actuated cylinders are coupled to the frame-side structure and the second ends of the hydraulically actuated cylinders are coupled to lateral opposite ends of the yoke. The extension of one hydraulically actuated cylinder of the pair of hydraulically actuated cylinders and simultaneous retraction of other hydraulically actuated cylinder of the pair of hydraulically actuated cylinders generates the controlled bi-directional rotational movement of the yoke. The slewing assembly further includes a spline arrangement formed on the shaft pin and configured to transfer the controlled bi-directional rotational movement of the shaft pin as a controlled bi-directional rotational movement of the conveyor-side structure. The controlled bi-directional rotational movement of the conveyor-side structure provides the rotational movement of the loading conveyor, about the vertical axis, with respect to the frame.

In yet another aspect of the present disclosure, a cold planer is described. The cold planer includes a frame supported by a plurality of ground engaging members. The frame defines a forward end in the cold planar. The cold planer also includes a milling drum supported by the frame and configured to remove material from a ground surface. The cold planer further includes a loading conveyor pivotally supported on the frame at the forward end thereof. The loading conveyor is configured to receive the material and to convey the material to a location off of the cold planer. The cold planer further includes a slewing assembly for providing a rotational movement of the loading conveyor, about a vertical axis, with respect to the frame. The slewing assembly includes a frame-side structure extending from the frame towards the loading conveyor, and a conveyor-side structure extending from the loading conveyor towards the frame-side structure. The slewing assembly includes a shaft pin disposed about a vertical axis, and pivotally connecting the frame-side structure and the conveyor-side structure. The slewing assembly also includes an actuator arrangement configured to generate a controlled bi-directional rotational movement of the shaft pin. The slewing assembly further includes a spline arrangement formed on the shaft pin and configured to transfer the controlled bi-directional rotational movement of the shaft pin as a controlled bi-directional rotational movement of the conveyor-side structure. The controlled bi-directional rotational movement of the conveyor-side structure provides the rotational movement of the loading conveyor, about the vertical axis, with respect to the frame.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
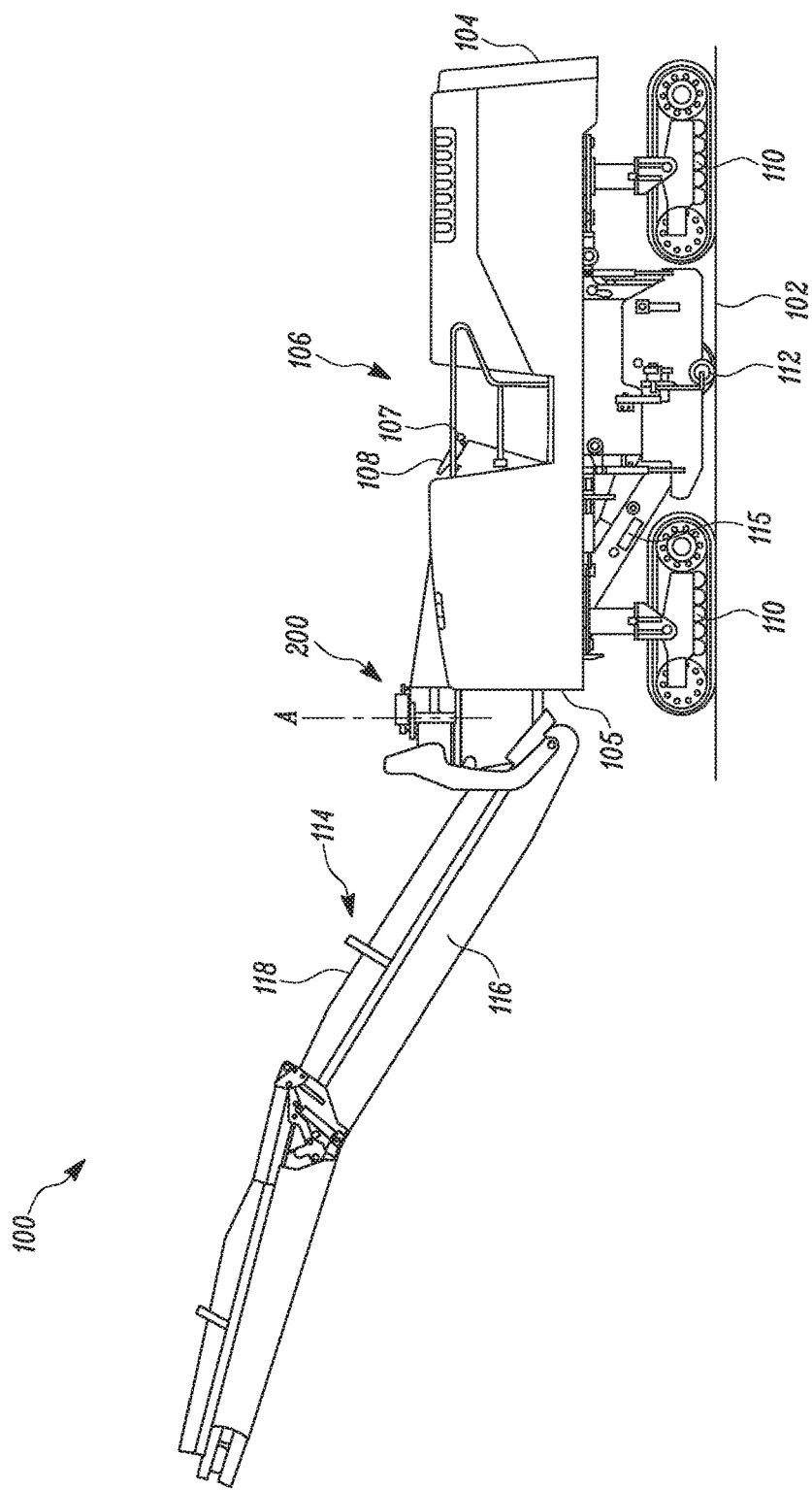
FIG. 1 illustrates a side diagrammatic view of an exemplary cold planer, in accordance with one or more embodiments of the present disclosure.

FIG. 1 illustrates a machine 100 which is a mobile machine operable to move along a ground surface 102. The ground surface 102 may be a man-made surface, such as a road, parking lot, concrete cement, or other paved surface. The machine 100 performs milling while traveling over the ground surface 102. In the illustrated embodiment of FIG. 1, the machine 100 is a cold planer. Hereinafter, the terms "machine 100" and "cold planer 100" have been interchangeably used, without any limitations. The cold planer 100 is configured to cut or grind a layer of concrete, asphalt, or similar material, to a certain depth below the ground surface 102.

The cold planer 100 may include various components and systems that serve various purposes. The cold planer 100 includes a frame 104 to support various components and systems of the cold planer 100. In some examples, the frame 104 defines an operator station 106 in the cold planer 100. In certain cases, the frame 104 may further define a canopy that extends over the operator station 106 of the cold planer 100 to help shield the operator of the machine and the controls in the operator station 106 from the environment. The operator station 106 may provide various input devices and control systems for the cold planer 100. For example, the operator station 106 may include devices for controlling engine operation, propulsion, steering, milling depth, rotor operation, and conveyor operation, to name a few. As illustrated in FIG. 1, the operator station 106 provides a steering device 108 for providing directional control during propulsion of the cold planer 100. The steering device 108 is shown to include a steering wheel, but other steering elements such as a joystick or levers may be used without any limitations.

The cold planer 100 also includes one or more power sources (not shown) supported on the frame 104, for powering various components and systems thereof. Typically the power source is an internal combustion engine, but may also include, batteries, fuel cells, or the like. The cold planer 100 also includes transmission mechanisms for transmitting power from the power source to various other components thereof. For example, where the cold planer 100 includes an internal combustion engine as a power source, the cold planer 100 may include one or more mechanical or electrical power-transmission devices, such as, mechanical transmissions, hydraulic pumps and motors, and/or electric generators and motors, for transmitting power from the engine to components and systems of the cold planer 100.

The cold planer 100 also includes one or more ground-engaging members 110 connected to the frame 104. The ground-engaging members 110 may be any device or devices configured to propel the cold planer 100 on the ground surface 102. The ground-engaging members 110 are driven by the internal combustion engine. FIG. 1 shows front ground-engaging members as well as rear ground-engaging members located on a right side of the cold planer 100, as observed by an operator from front side of the cold planer 100. It may be contemplated that the cold planer 100 may also include similar front and rear ground-engaging members on a left side as well. In the illustrated example, the ground-engaging members 110 are shown to include track units. However, in other examples, the ground-engaging members 110 may include some alternatives to track units including, but not limited to, wheels, and skids.

In the cold planer 100, the frame 104 supports a milling drum 112 configured to remove or grind a layer of the ground surface 102. In some examples, the milling drum 112 may include a rotor with a plurality of cutting tools configured to remove the ground surface 102. However, any other material removal mechanism or grinding arrangement may be used without any limitations. The motive power for the milling drum 112 may be provided by the internal combustion engine. A cutting plane of the cold planer 100 may be tangent to the bottom of the milling drum 112 and parallel to the direction of travel of the cold planer 100. In some examples, the cold planer 100 may include some arrangement to raise and lower the milling drum 112 relative to the ground-engaging members 110 so as to control a depth of cut for the milling drum 112.

The cold planer 100 also includes at least one controller (not shown), such as a programmed computer logic and associated memory, for translating input commands received from various input devices, or control systems, of the cold planer 100 into command signals for controlling the appropriate system or device thereof. In some examples, the cold planer 100 may include additional controls positioned at the sides and/or near the ground engaging members 110 for more precisely controlling the milling operation while walking alongside the cold planer 100.

Further, in the cold planer 100, the frame 104 may support a loading conveyor 114 that is located adjacent the milling drum 112. The loading conveyor 114 may be configured to receive the material removed from the ground surface 102 by the milling drum 112. The loading conveyor 114 may be further configured to convey the received material to a location off of the cold planer 100, such as to a receiver, e.g., another truck separate from the cold planer 100. For example, the truck may be a dump truck that includes a dump container; and the truck may drive next to the cold planer 100 during grinding of the ground surface 102, at approximately the same speed as the cold planer 100, so that the material is conveyed by the loading conveyor 114 and dropped into the dump container. In some examples, the cold planer 100 may include a lower conveyor unit 115 that may be located adjacent the milling drum 112 and disposed in material exchange relationship with the loading conveyor 114. The lower conveyor unit 115 may be configured to receive the material from the milling drum 112 and to convey the material to the loading conveyor 114, in turn for further conveying to a location off of the cold planer 100.

In the illustrated embodiment, the loading conveyor 114 is supported on a forward end 105 of the frame 104 of the cold planer 100. In particular, the loading conveyor 114 includes a cantilever arm 116 mounted to the frame 104 and a driven belt 118 entrained on the cantilever arm 116. In a known manner, the loading conveyor 114 is hinged so that the loading conveyor 114 may be folded to facilitate transport and storage of the cold planer 100. In some examples, the loading conveyor 114 may be pivotally connected to the frame 104. The pivotal connection between the frame 104 and the loading conveyor 114 may permit rotation of the loading conveyor 114 relative to the frame 104, about a vertical axis 'A'. By this arrangement, the loading conveyor 114 may be positioned so that the material removed from the ground surface 102 and conveyed by the loading conveyor 114 may be efficiently delivered, for example, to the dump container of a dump truck that is disposed proximately below an end of the loading conveyor 114. It may be contemplated that, in some examples, the pivotal connection between the frame 104 and the loading conveyor 114 may further permit vertical adjustment of the loading conveyor 114 with respect to the frame 104.

In one example, the operator station 106 may provide a control switch 107 or the like, for controlling the rotational movement of the loading conveyor 114 with respect to the frame 104. The control switch 107 may be moved by an operator of the cold planer 100 to generate corresponding rotational movement of the loading conveyor 114. For this purpose, the movement of the control switch 107 may be translated as electrical, hydraulic or electro-hydraulic signals which are conveyed to respective electric, hydraulic or electro-hydraulic actuators, such as motors, which generate a bi-directional rotational movement of the loading conveyor 114, as will be discussed later. The controller may be configured to regulate the rotational movement of the loading conveyor 114 within certain physical constraints or limits. For this purpose, the controller may normalize the signals from the control switch 107 such that an output of the actuator, and the corresponding movement of the loading conveyor 114, may be regulated. In one example, the loading conveyor 114 may be adapted to rotate between ±60° (in clockwise and counter-clockwise rotational directions).

Figure 2:
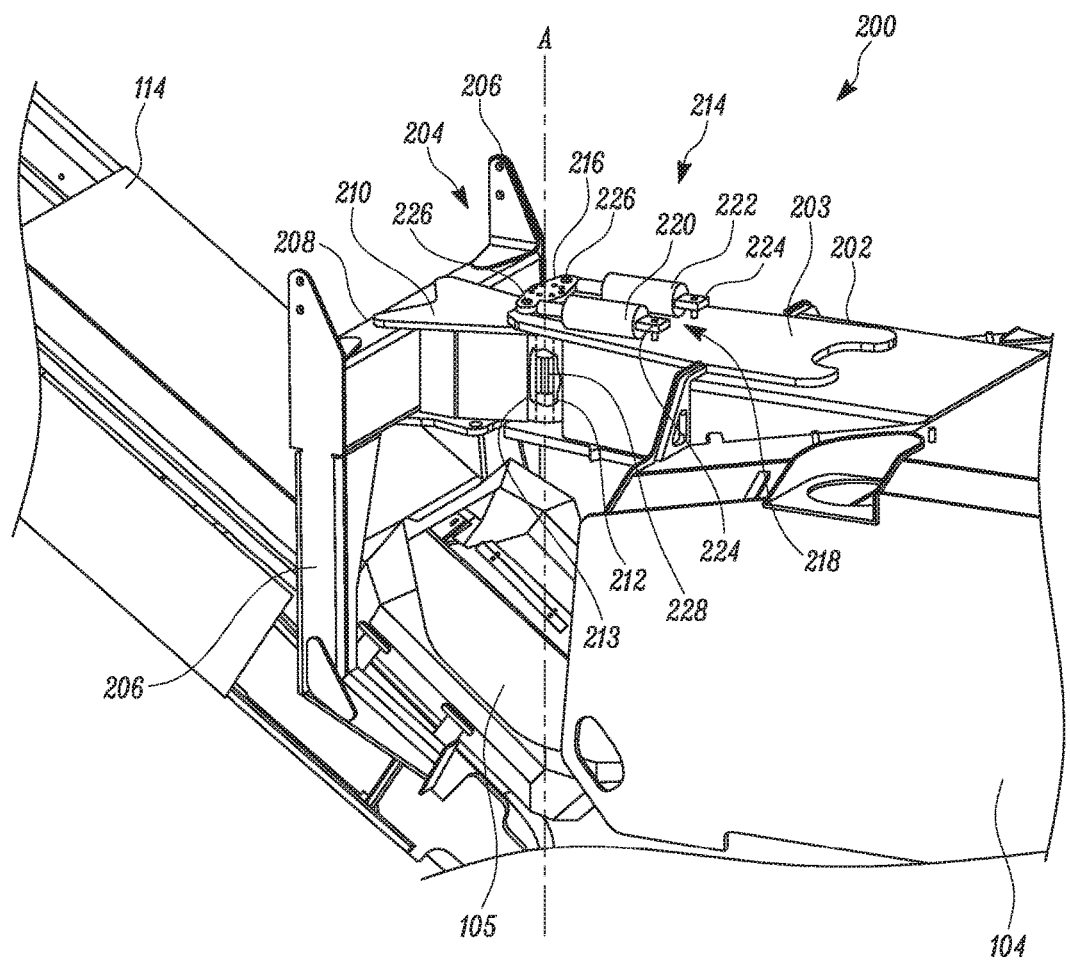
FIG. 2 illustrates a partial side perspective view of the cold planer showing a slewing assembly, in accordance with one embodiment of the present disclosure.

According to an embodiment, the cold planer 100 includes a slewing assembly 200 for providing the rotational movement of the loading conveyor 114 with respect to the frame 104, about the vertical axis 'A'. FIG. 2 illustrates a side perspective view of a portion of the cold planer 100 showing the slewing assembly 200 in relation to the frame 104 and the loading conveyor 114. As illustrated, the slewing assembly 200 includes supporting structures that are co-operatively and pivotally connected to each other to allow rotational movement of the loading conveyor 114 with respect to the frame 104, about the vertical axis 'A'. In particular, the slewing assembly 200 includes a frame-side structure 202 extending from the frame 104, generally towards the loading conveyor 114; and a conveyor-side structure 204 extending from the loading conveyor 114, generally towards the frame 104, or particularly the frame-side structure 202. The frame-side structure 202 and the conveyor-side structure 204 may extend mid-air up to somewhat middle of a distance between the frame 104 and the loading conveyor 114.

In some embodiments, the frame-side structure 202 may be connected to the frame 104, either directly or indirectly with additional components between the frame-side structure 202 and the frame 104. The frame-side structure 202 may be in the form of a flange, which may be bolted, welded, or otherwise attached, again either directly or indirectly, to the frame 104. As illustrated, in some embodiments, the frame-side structure 202 may extend approximately horizontally from the frame 104, when the cold planer 100 is located on a horizontal ground surface 102. Although FIG. 2 shows the frame-side structure 202 having a particular shape and being a relatively flat plate, the frame-side structure 202 is not limited to this shape. For example, the frame-side structure 202 may include one or more portions having a square, rectangular, triangular, or any other desired shape.

Similarly, in some embodiments, the conveyor-side structure 204 may be connected to the loading conveyor 114, either directly or indirectly with additional components between the conveyor-side structure 204 and the loading conveyor 114. As illustrated, the conveyor-side structure 204 includes two arms 206 that extend approximately vertically from two laterally opposing sides of the loading conveyor 114, when the loading conveyor 114 is connected to the frame 104 and the cold planer 100 is located on a horizontal ground surface 102. The arms 206 are connected to the loading conveyor 114 proximal to the end of the loading conveyor 114 connected to the frame 104. The conveyor-side structure 204 includes a beam member 208 disposed and supported between the two arms 206. Furthermore, the conveyor-side structure 204 includes a plate member 210 supported on the beam member 208 from one side and extending towards the frame-side structure 202 at the other side. The plate member 210 may be in the form of a flange, which may be bolted, welded, or otherwise attached, again either directly or indirectly, to the beam member 208. The plate member 210 is complementary to the frame-side structure 202 with a substantially similar shape.

The slewing assembly 200 includes a shaft pin 212 disposed about the vertical axis 'A', and pivotally connecting the frame-side structure 202 and the conveyor-side structure 204. For this purpose, the frame-side structure 202 may include through-holes (not shown) with an axis that extends approximately perpendicularly between top and bottom surfaces thereof. Similarly, the conveyor-side structure 204 may include through-holes (not shown) with an axis that extends approximately perpendicularly between top and bottom surfaces thereof. The through-holes may be sized, shaped and/or located so that the through-holes form a vertical cylindrical shaped protrusion when the frame-side structure 202 and the conveyor-side structure 204 are aligned and mate with one another. The shaft pin 212 may be vertically disposed and locked in the vertical cylindrical shaped protrusion, so as to pivotally connect the frame-side structure 202 and the conveyor-side structure 204. The slewing assembly 200 may include a hollow shaft 213 being rigidly connected to the conveyor-side structure 204. As more clearly illustrated in FIG. 5, the hollow shaft 213 may enclose the shaft pin 212, in the slewing assembly 200. For the purpose of illustration, a partial cut-away is provided in FIGS. 2-3 to show component internal to the hollow shaft 213, such as the shaft pin 212 disposed within the hollow shaft 213.

Figure 3:
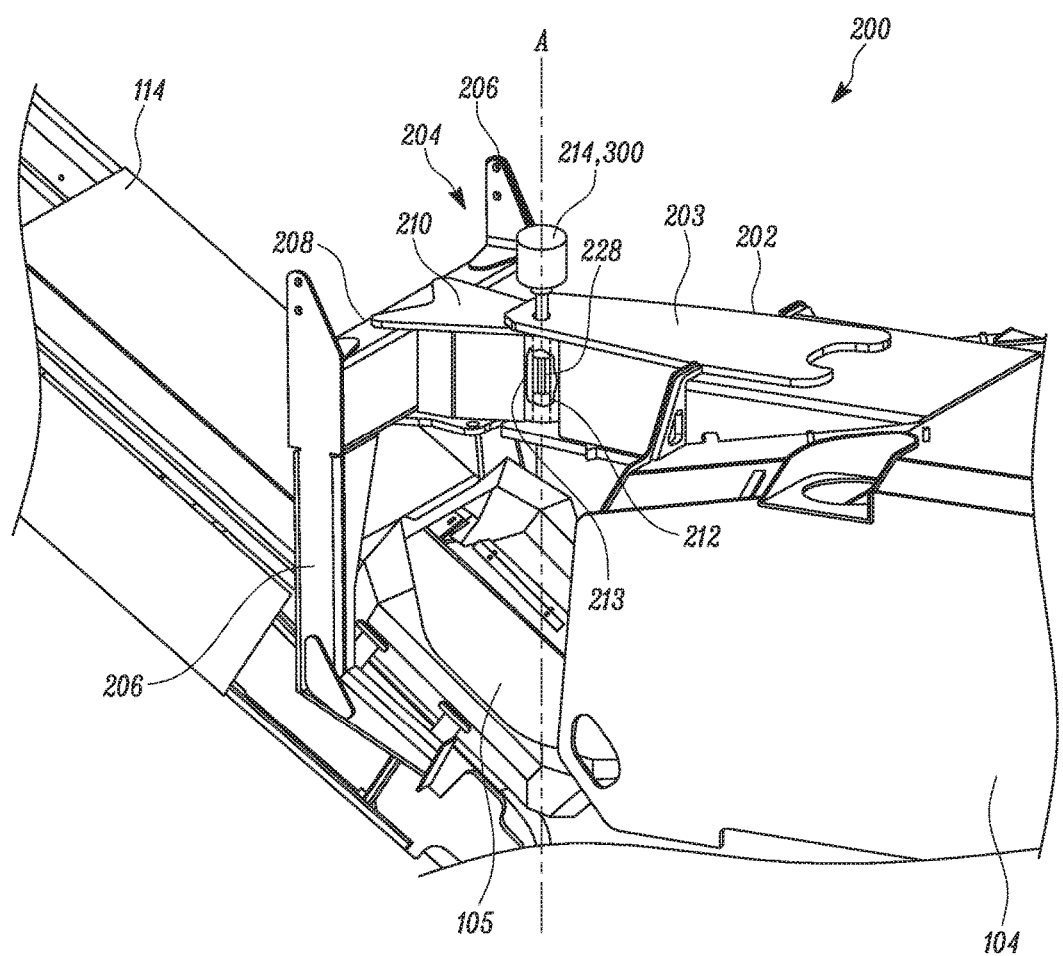
FIG. 3 illustrates a partial side perspective view of the cold planer showing the slewing assembly, in accordance with an alternate embodiment of the present disclosure.
Figure 5:
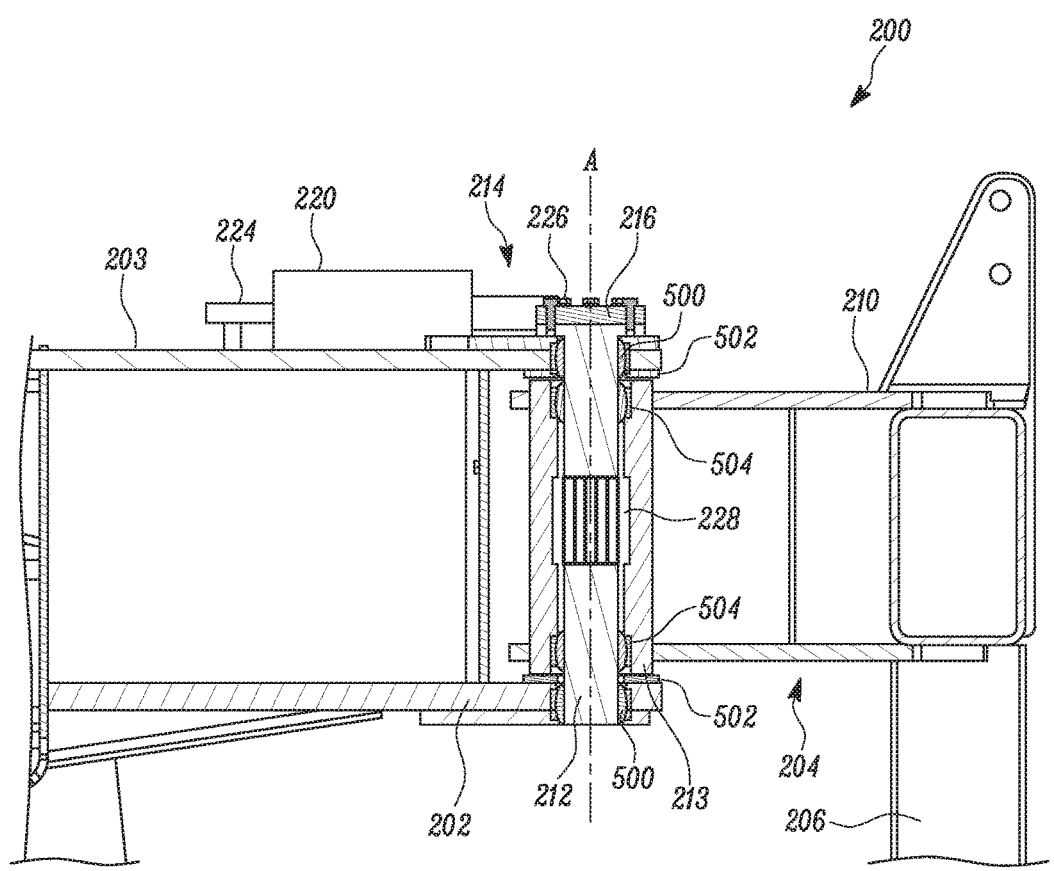
FIG. 5 illustrates a partial sectional view of the cold planer showing the slewing assembly along a vertical plane of FIG. 4, in accordance with one embodiment of the present disclosure.

Furthermore, as illustrated in FIGS. 2-3 and shown in FIG. 5, the slewing assembly 200 includes a spline arrangement 228 formed on the shaft pin 212. The spline arrangement 228 may be located somewhat in the middle of vertical length of the shaft pin 212. The spline arrangement 228 may include splines formed as external longitudinal grooves on an external surface of the shaft pin 212, and the hollow shaft 213 may include corresponding splines formed as internal longitudinal grooves in mesh with the external longitudinal grooves. Accordingly, the spline arrangement 228 may transfer a controlled bi-directional rotational movement of the shaft pin 212 as a controlled bi-directional rotational movement of the hollow shaft 213, and in turn the conveyor-side structure 204. The controlled bi-directional rotational movement of the conveyor-side structure 204 results in a controlled bi-directional rotational movement of the loading conveyor 114, about the vertical axis 'A', with respect to the frame 104.

Additionally, the slewing assembly 200 includes an actuator arrangement 214 configured to generate the controlled bi-directional rotational movement of the shaft pin 212. The actuator arrangement 214 may include one or more actuators, motors, or any other components for generating rotational movement of the loading conveyor 114 about the vertical axis 'A'. The actuator arrangement 214 may be generally engaged, directly or indirectly, with the shaft pin 212 to generate the controlled bi-directional rotational movement thereof. In an embodiment, the actuator arrangement 214 may be arranged, generally, on a top portion 203 of the frame-side structure 202. In other words, the actuator arrangement 214 may be generally located on top of the frame 104 of the cold planer 100. However, the actuator arrangement 214 may be arranged on bottom portion of the frame-side structure 202 without any limitations and still achieves the required purpose.

Figure 4:
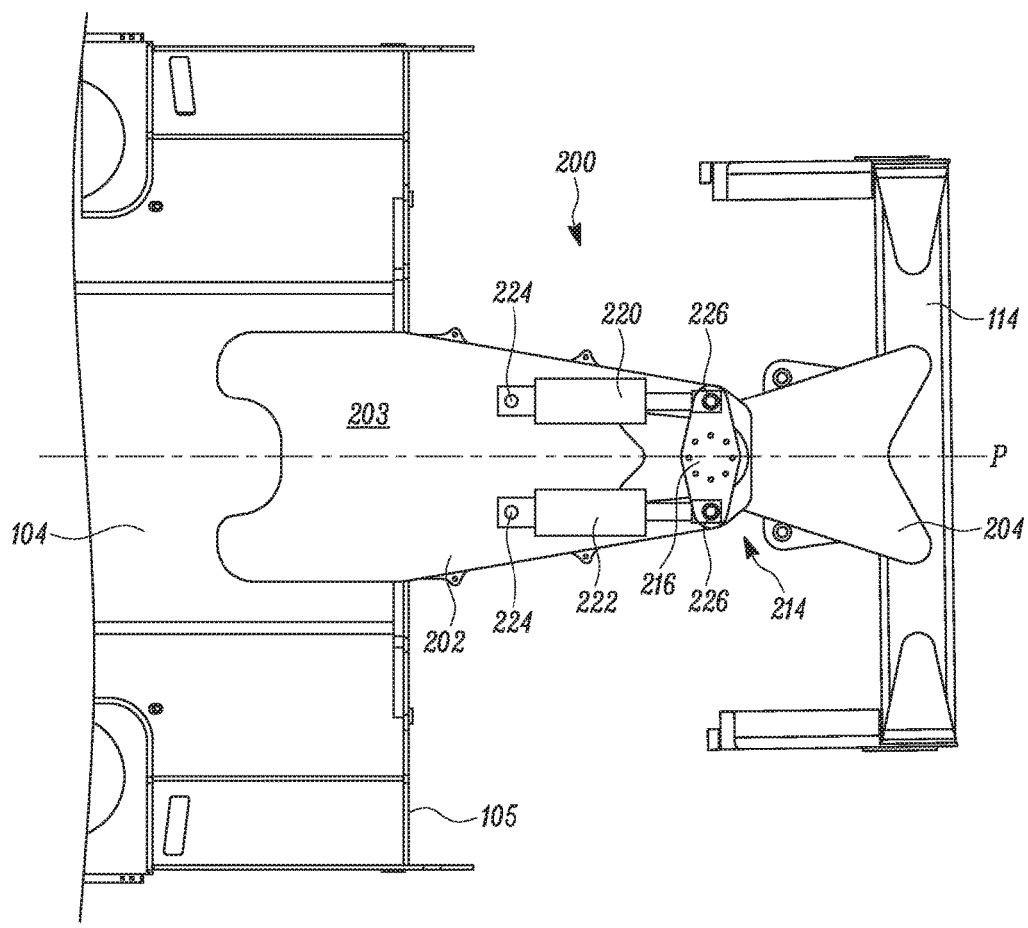
FIG. 4 illustrates a partial top planar view of the cold planer showing the slewing assembly, in accordance with one embodiment of the present disclosure.

In one embodiment, as illustrated in FIG. 2, the actuator arrangement 214 includes a yoke 216 fixedly coupled with the shaft pin 212 about its center, such that a controlled bi-directional rotational movement of the yoke 216 provides the controlled bi-directional rotational movement of the shaft pin 212, about the vertical axis 'A'. In one example, the yoke 216 may be in the form of a flat plate mounted, using bolts or the like, to a top face (not shown) of the shaft pin 212. Further, the actuator arrangement 214 includes a pair of hydraulically actuated cylinders 218, where the pair of hydraulically actuated cylinders 218 includes a first cylinder 220 and a second cylinder 222. As shown in FIG. 4, each hydraulically actuated cylinder, i.e., both the first cylinder 220 and the second cylinder 222, have respective first ends 224 and respective second ends 226. The first ends 224 are coupled to the frame-side structure 202 and the second ends 226 are coupled to lateral opposite ends of the yoke 216. The extension of one hydraulically actuated cylinder of the pair of hydraulically actuated cylinders 218 and simultaneous retraction of the other hydraulically actuated cylinder of the pair of hydraulically actuated cylinders 218 generates the controlled bi-directional rotational movement of the yoke 216. That is, the extension of the first cylinder 220 and simultaneous retraction of the second cylinder 222 generates a clockwise rotational movement of the yoke 216 as observed from top thereof, and vice-versa.

Further, the first cylinder 220 and the second cylinder 222 are operatively arranged in a parallel configuration with respect to each other. The first cylinder 220 and the second cylinder 222 may be positioned in parallel with respect to each other, only when the loading conveyor 114 is positioned in a straight line with respect to the frame 104 of the cold planer 100; i.e., a central axis of the frame 104 is coincident with a central axis of the loading conveyor 114, as shown in the drawings and particularly in FIG. 4. Further, when the loading conveyor 114 pivots about the vertical axis 'A', the yoke 216 rotates about its center and the second ends 226 are displaced relative to each other, such that the first cylinder 220 and the second cylinder 222 may form some angle with respect to each other (not shown in the drawings).

In an alternate embodiment, as illustrated in FIG. 3, the actuator arrangement 214 includes a motor 300. The motor 300 may be operatively coupled with the shaft pin 212, specifically with the top face of the shaft pin 212; and configured to generate the controlled bi-directional rotational movement of the shaft pin 212 about the vertical axis 'A'. The motor 300 may be directly coupled with the shaft pin 212; or alternatively, indirectly coupled with the shaft pin 212 by means of a gear-box or the like. The use of the motor 300, instead of the pair of hydraulically actuated cylinders 218, in the actuator arrangement 214, eliminates the need of the yoke 216 (as used in the embodiment of FIG. 2). The motor 300 may, generally, be a torque motor of either AC or DC type. In one example, the motor 300 is a bi-directional hydraulic motor. However, any other suitable motor may be used which may provide rotational movement to the shaft pin 212 about the vertical axis 'A', without any limitations.

FIG. 5 illustrates a sectional view of the slewing assembly 200 about a vertical plane 'P' of FIG. 4. The slewing assembly 200 includes one or more frame bearings 500 disposed about the shaft pin 212. The frame bearings 500 are engaged between the frame-side structure 202 and the conveyor-side structure 204, and configured to facilitate the controlled bi-directional rotational movement of the conveyor-side structure 204 with respect to the frame-side structure 202. The slewing assembly 200 also includes one or more thrust washers 502 associated with the one or more frame bearings 500. The thrust washers 502 are configured to bear axial loads experienced by the one or more frame bearings 500 during the transfer of rotational movement. The slewing assembly 200 also includes one or more pivot bearings 504 operatively associated with the spline arrangement 228, and configured to facilitate transfer of the controlled bi-directional rotational movement of the shaft pin 212 to the hollow shaft 213, or generally to the conveyor-side structure 204.

INDUSTRIAL APPLICAPBILITY

In cold planers, a frame and a loading conveyor are pivotally disposed by a through-pin design, e.g., using a shaft pin. Such a through pin design helps with handling high loads incurred during the relative movement of the frame and the loading conveyor. Conventionally, rotational movement of the loading conveyor is generated using a pair of hydraulic cylinders that are connected to a forward end of a frame of the machine at their respective first ends and to the loading conveyor at their respective second ends; and simultaneous extension and retraction of these hydraulic cylinders causes the rotational movement of the loading conveyor about a vertical axis. As these hydraulic cylinders are generally disposed angularly with respect to each other, it may cause differing cylinder travel velocities. The through pin design with differing cylinder travel velocities could lead to uneven moment arms throughout the travel while causing situations such as over-centering.

A solution is to use parallel arrangement of the hydraulic actuated cylinders 220, 222. In order to implement the parallel arrangement along with the through-pin design, the slewing assembly 200 arrange the actuator arrangement 214, or the pair of hydraulically actuated cylinders 218, at the top portion 203, as compared to the forward end 105 of the frame 104 in conventional design; and further provides the spline arrangement 228 for transferring the controlled bi-directional rotational movement of the shaft pin 212 provided by the actuator arrangement 214 as a controlled bi-directional rotational movement of the conveyor-side structure 204, which in turn is translated as the rotational movement of the loading conveyor 114. The slewing assembly 200 also provides the frame bearings 500, the thrust washers 502 and the pivot bearings 504 to facilitate, directly or indirectly, translation of the rotational movement of the shaft pin 212 to the rotational movement of the loading conveyor 114.

The parallel arrangement of the cylinders 220, 222 provides an optimum geometry for the pair of hydraulically actuated cylinders 218, in the actuator arrangement 214. The parallel arrangement of the cylinders 220, 222 results in same travel speeds thereof while also having equal moment arms, and thereby overcome the shortcomings of the conventional designs. Furthermore, the parallel arrangement of the cylinders 220, 222 allows for a much simpler alternative for the actuator arrangement 214, where simply the motor 300 is used being directly coupled to the shaft pin 212 for rotation thereof. Thus, the slewing assembly 200 provides a better design and is more efficient and cost-effective over a longer period of time, as compared to the conventional designs.

While aspects of the present disclosure have been particularly shown and described with reference to the embodiments above, it will be understood by those skilled in the art that various additional embodiments may be contemplated by the modification of the disclosed machines and assemblies without departing from the spirit and scope of what is disclosed. Such embodiments should be understood to fall within the scope of the present disclosure as determined based upon the claims and any equivalents thereof.

What is claimed is:

1. A slewing assembly for providing a rotational movement of a loading conveyor pivotally supported on a cold planer, the slewing assembly comprising:
   a frame-side structure extending from a frame towards the loading conveyor;
   a conveyor-side structure extending from the loading conveyor towards the frame-side structure;
   a shaft pin disposed about a vertical axis, and pivotally connecting the frame-side structure and the conveyor-side structure;
   one or more frame bearings disposed about the shaft pin between the frame-side structure and the conveyor-side structure;
   an actuator arrangement connected to the shaft pin and configured to generate a controlled bi-directional rotational movement of the shaft pin; and
   a spline arrangement formed on the shaft pin and configured to transfer the controlled bi-directional rotational movement of the shaft pin as a controlled bi-directional rotational movement of the conveyor-side structure, wherein the controlled bi-directional rotational movement of the conveyor-side structure provides the rotational movement of the loading conveyor, about the vertical axis, with respect to the frame.

2. The slewing assembly of claim 1, wherein the actuator arrangement comprises a yoke fixedly coupled with the shaft pin such that a controlled bi-directional rotational movement of the yoke provides the controlled bi-directional rotational movement of the shaft pin.

3. The slewing assembly of claim 2, wherein the actuator arrangement further comprises a pair of hydraulically actuated cylinders operatively arranged in a parallel configuration with respect to each other, each hydraulically actuated cylinder having a first end and a second end respectively, wherein the first ends are coupled to the frame-side structure and the second ends are coupled to lateral opposite ends of the yoke, and wherein extension of one hydraulically actuated cylinder of the pair of hydraulically actuated cylinders and simultaneous retraction of other hydraulically actuated cylinder of the pair of hydraulically actuated cylinders generates the controlled bi-directional rotational movement of the yoke.

4. The slewing assembly of claim 1, wherein the actuator arrangement comprises a motor operatively coupled with the shaft pin and configured to generate the controlled bi-directional rotational movement of the shaft pin.

5. The slewing assembly of claim 4, wherein the motor is a hydraulic motor.

6. The slewing assembly of claim 1, wherein the actuator arrangement is located on a top potion of the frame-side structure.

7. The slewing assembly of claim 1, wherein the one or more frame bearings are configured to facilitate the controlled bi-directional rotational movement of the conveyor-side structure with respect to the frame-side structure.

8. The slewing assembly of claim 7 further comprising, one or more thrust washers associated with the one or more frame bearings, and configured to bear axial loads experienced by the one or more frame bearings.

9. The slewing assembly of claim 1 further comprising, one or more pivot bearings associated with the spline arrangement, and configured to facilitate transfer of the controlled bi-directional rotational movement of the shaft pin to the conveyor-side structure.

10. A slewing assembly for providing a rotational movement of a loading conveyor pivotally supported on a cold planer, the slewing assembly comprising:
    a frame-side structure extending from a frame towards the loading conveyor;
    a conveyor-side structure extending from the loading conveyor towards the frame-side structure;
    a shaft pin disposed about a vertical axis, and pivotally connecting the frame-side structure and the conveyor-side structure;
    a yoke fixedly coupled with the shaft pin such that a controlled bi-directional rotational movement of the yoke provides a controlled bi-directional rotational movement of the shaft pin;
    a pair of hydraulically actuated cylinders operatively arranged in a parallel configuration with respect to each other, each hydraulically actuated cylinder having a first end and a second end respectively, wherein the first ends are coupled to the frame-side structure and the second ends are coupled to lateral opposite ends of the yoke, and wherein extension of one hydraulically actuated cylinder of the pair of hydraulically actuated cylinders and simultaneous retraction of other hydraulically actuated cylinder of the pair of hydraulically actuated cylinders generates the controlled bi-directional rotational movement of the yoke;

a spline arrangement formed on the shaft pin and configured to transfer the controlled bi-directional rotational movement of the shaft pin as a controlled bi-directional rotational movement of the conveyor-side structure, wherein the controlled bi-directional rotational movement of the conveyor-side structure provides the rotational movement of the loading conveyor, about the vertical axis, with respect to the frame; and one or more frame bearings disposed about the shaft pin between the frame-side structure and the conveyor-side structure.

11. The slewing assembly of claim 10, wherein the pair of hydraulically actuated cylinders is located on a top portion of the frame-side structure.

12. The slewing assembly of claim 10, wherein the pair of hydraulically actuated cylinders and the one or more frame bearings are configured to facilitate the controlled bi-directional rotational movement of the conveyor-side structure with respect to the frame-side structure.

13. The slewing assembly of claim 12 further comprising, one or more thrust washers associated with the one or more frame bearings, and configured to bear axial loads experienced by the one or more frame bearings.

14. The slewing assembly of claim 10 further comprising, one or more pivot bearings associated with the spline arrangement, and configured to facilitate transfer of the controlled bi-directional rotational movement of the shaft pin to the conveyor-side structure.

15. A cold planer comprising:
a frame supported by a plurality of ground engaging members, the frame defining a forward end in the cold planar;
a milling drum supported by the frame and configured to remove material from a ground surface;
a loading conveyor pivotally supported on the frame at the forward end thereof, the loading conveyor configured to receive the material and to convey the material to a location off of the cold planer; and
a slewing assembly for providing a rotational movement of the loading conveyor, about a vertical axis, with respect to the frame, the slewing assembly comprising:
a frame-side structure extending from the forward end of the frame towards the loading conveyor;
a conveyor-side structure extending from the loading conveyor towards the frame-side structure;
a shaft pin disposed about a vertical axis, and pivotally connecting the frame-side structure and the conveyor-side structure;
an actuator arrangement connected to the shaft pin and configured to generate a controlled bi-directional rotational movement of the shaft pin;
a spline arrangement formed on the shaft pin and configured to transfer the controlled bi-directional rotational movement of the shaft pin as a controlled bi-directional rotational movement of the conveyor-side structure, wherein the controlled bi-directional rotational movement of the conveyor-side structure provides the rotational movement of the loading conveyor, about the vertical axis, with respect to the frame; and
one or more frame bearings disposed about the shaft pin between the frame-side structure and the conveyor-side structure, and configured to facilitate the controlled bi-directional rotational movement of the conveyor-side structure with respect to the frame-side structure.

16. The cold planer of claim 15, wherein the slewing assembly further comprises a yoke fixedly coupled with the shaft pin such that a controlled bi-directional rotational movement of the yoke provides the controlled bi-directional rotational movement of the shaft pin.

17. The cold planer of claim 16, wherein the actuator arrangement comprises a pair of hydraulically actuated cylinders operatively arranged in a parallel configuration with respect to each other, each hydraulically actuated cylinder comprising a first end and a second end respectively, wherein the first ends are coupled to the frame-side structure and the second ends are coupled to lateral opposite ends of the yoke, wherein extension of one hydraulically actuated cylinder of the pair of hydraulically actuated cylinders and simultaneous retraction of other hydraulically actuated cylinder of the pair of hydraulically actuated cylinders generates the controlled bi-directional rotational movement of the yoke.

18. The cold planer of claim 15, wherein the actuator arrangement comprises a motor operatively coupled with the shaft pin and configured to generate the controlled bi-directional rotational movement of the shaft pin.

19. The cold planer of claim 15, wherein the actuator arrangement is located on a top portion of the frame-side structure.

20. The cold planer of claim 15 further comprising:
one or more thrust washers associated with the one or more frame bearings, and configured to bear axial loads experienced by the one or more frame bearings; and
one or more pivot bearings associated with the spline arrangement, and configured to facilitate transfer of the controlled bi-directional rotational movement of the shaft pin to the conveyor-side structure.

* * * * *